United States Patent Office 3,527,108
Patented Sept. 8, 1970

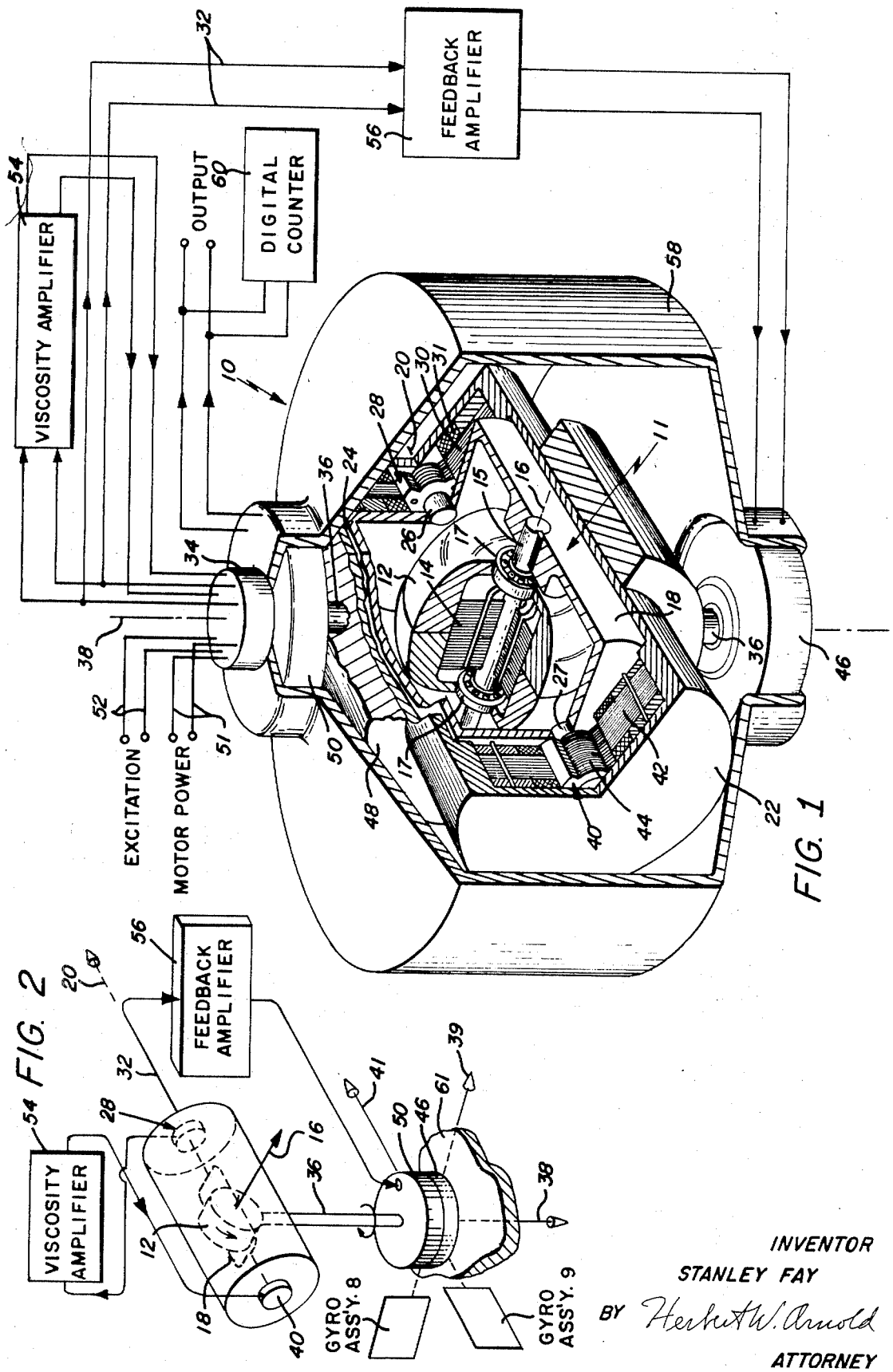

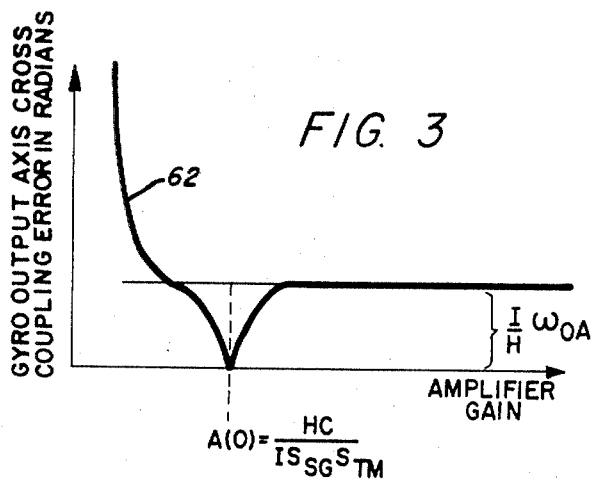
FIG. 3
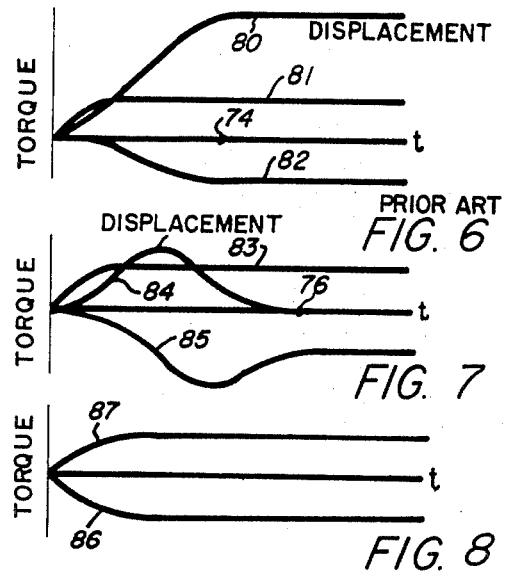
FIG. 6 PRIOR ART
FIG. 7
FIG. 8
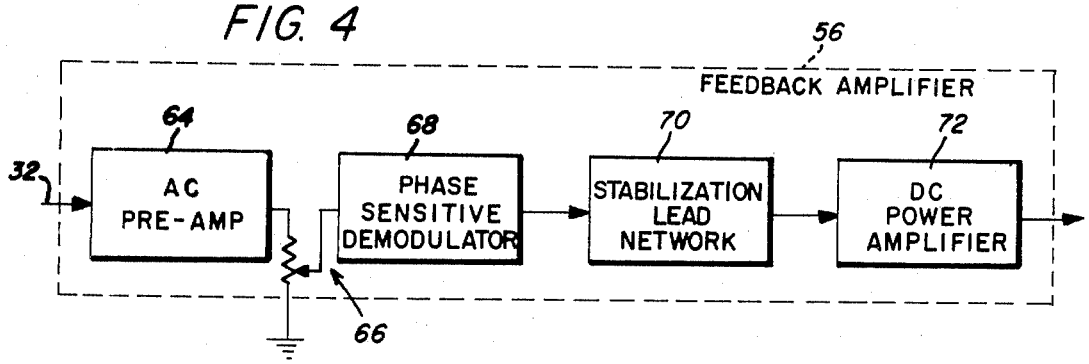
FIG. 4
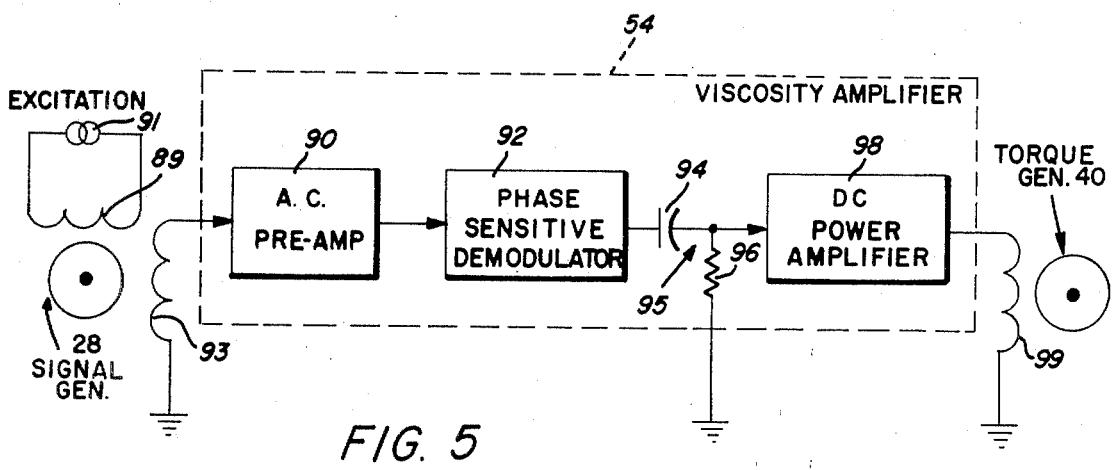
FIG. 5

3,527,108
ZERO CROSS-COUPLING SINGLE AXIS
GYRO STABILIZATION SYSTEM
Stanley Fay, West Roxbury, Mass., assignor to Raytheon
Company, Lexington, Mass., a corporation of Delaware
Filed Jan. 2, 1968, Ser. No. 695,151
Int. Cl. G01c 19/16
U.S. Cl. 74—5                                          21 Claims

ABSTRACT OF THE DISCLOSURE

A gyro stabilization system having feedback loop amplification which is adjusted so that the gyroscopic reaction torque which opposes the applied precessional torque becomes balanced therewith without the usual residual angular displacement of the output shaft of the system resulting from system rotation having a component of motion about the system gyro output axis thereby eliminating error due to cross-coupling of such motion. The amplification adjustment is manifest as a null indication on the system output shaft pickoff device when the system is subjected to angular motion and oriented so that the angular motion occurs about the gyro output axis. Afer such adjustment, the aforementioned error is eliminated for system rotation about any axis. In such stabilization systems of the gas bearing types, viscosity used in tuning out cross-coupling is provided artificially by separate torque generating means. In some gyro systems, as of the strapped down type, further reduction of cross-coupling error is achieved by making specific elements exhibit isoinertial characteristics.

BACKGROUND OF THE INVENTION

This invention relates to gyroscopic apparatus and more particularly to gyroscopic apparatus for accurately measuring the angular motion relative to inertial space of a body upon which the apparatus is mounted.

As is known, a common type of gyroscopic apparatus is made up of a gyro element which includes a rotor or rotatable member supported for rotation by a gimbal structure. The gyro element in turn, is supported on a trunnion shaft of another gimbal structure or trunnion assembly for rotation about the trunnion or sensitive axis which is the angular motion input axis for both the gyro element and gyroscopic apparatus. The gyro element mounted on the trunnion shaft usually is either of the floated type or gas bearing type to reduce friction about the gyro element output axis. This latter axis is the axis of the gyro element gimbal structure which is orthogonal to both the gyro element input axis and the rotor or spin axis. Friction along the trunnion or sensitive axis which tends to induce errors in output indications of the gyroscope apparatus is usually reduced through the use of a feedback loop including amplifying means extending from a pick-off device on the gyro element output axis to a torque generating means on the trunnion axis. Gyroscopic apparatus of this type is sometimes referred to as a single axis platform and frequently is mounted on a moving vehicle for measuring angular motion of the vehicle relative to inertial space about the aforementioned trunnion or sensitive axis. In an arrangement of this type the amplifying means is usually adjusted to relatively high levels of amplification in order that signals representing small trunnion shaft angular displacements due to said friction are amplified to a level at which the torque generating means generates adequate friction-opposing torque to compensate for such displacements.

An important difficulty associated with gyroscopic apparatus, such as a single axis platform arrangement of the above type when mounted on a vehicle, is erroneous readings due to a component of angular motion of the vehicle about the gyro element output axis. In particular, such gyro output axis motion induces erroneous rotation of the gyro element about its trunnion or sensitive axis resulting in commonly referred to gyro output axis cross-coupling error. Thus, motion of the vehicle about the gyro output axis induces a signal in the output axis pick-off device which is amplified and applied to the torque generating means on the trunnion axis. The resulting torque produces an unwanted angular displacement of the trunnion assembly about the trunnion axis which is known as gyro output axis cross-coupling error. The amplifying means which is used to reduce the effect of friction on the trunnion shaft thus becomes a primary means for coupling vehicle motion about the gyro output axis to the trunnion shaft and producing the unwanted trunnion shaft displacement or output axis cross-coupling. Heretofore, elimination of such cross-coupling error in readings or measurements provided by a single axis platform has been difficult, if not impossible, to achieve.

A triad of single axis platforms, arranged to read body frame or vehicle angular motion in three dimensions, has been utilized in connection with a computer in order to calculate the value of the component of such vehicle angular motion about each gyro element output axis. These calculated values are then used by the computer to determine the value of each erroneous cross-coupling reading and to subtract it from the corresponding angular reading of each single axis platform. These readings are sensed by a pick-off device on each trunnion shaft which measures relative motion of the vehicle with respect to the trunnion assembly. A decoupling program or computerized procedure of the above type, in addition to requiring a computer input comprising a minimum of three input signals from the triad of gyroscopic instruments, also requires considerable utilization of available computer equipment or computer time tending to add to the volume and weight burden of the vehicle.

It is, therefore, an important object of the invention to provide gyroscopic apparatus having improved accuracy of measurement by the substantial elimination of cross-coupling error due to vehicle motion about the gyro output axis or a component of vehicle motion about the gyro output axis.

A further difficulty associated with gyroscopic apparatus is the so-called anisoinertial cross-coupling error which contributes to the inaccuracy of readings in response to angular motion of such apparatus relative to inertial space. Aniso-inertial cross-coupling, as is known, is defined as cross-coupling of the angular motion of gyroscopic apparatus, such as the single axis platform, about any two orthogonal reference axes into a third reference axis, thereby contributing a resultant error component to the aforementioned output axis reading of the apparatus. This form of cross-coupling is due to the angular motion of the gyroscopic apparatus, or single axis platform apparatus, with respect to inertial space acting in conjunction with unequal moments of inertia in orthogonal directions of either the gyro element or the trunnion assembly, or both, to provide the resultant error component. Inasmuch as the trunnion assembly includes the trunnion shaft together with its associated gimbal elements, including a gyro housing for the gyro element, it is readily understood that such assembly seldom has equal moments of inertia in the three orthogonal reference directions. For example, distribution of the mass of the gyro element in one direction may differ from the distribution in an orthogonal direction inducing the anisoinertial cross-coupling effect. While substantially no anisoinertial effects exist in gyroscopic apparatus when mounted on a stabilized platform, such effects present a problem when the gyroscopic apparatus is tied directly to an angularly moving vehicle.

The gyroscopic apparatus when attached in this manner is sometimes referred to as a strapped down gyro system. In this instance, angular motion of the gyroscopic apparatus and attached vehicle directly and mechanically induces the aforementioned anisoinertial cross-coupling effect which contributes a component to the gyro output axis cross-coupling error apart from that component coupled in through the aforementioned feedback amplifier.

It is, therefore, a further object of the invention to substantially eliminate anisoinertial cross-coupling error in the measurement of the motion of the trunnion or output shaft relative to the vehicle. While this anisoinertial error frequently constitutes a quantity as small as approximately one percent of the gyro output axis cross-coupling error, there are certain applications in which removal of substantially all output axis cross-coupling error becomes desirable, whether from anisoinertial cross-coupling or from gyro output axis motion cross-coupling.

SUMMARY OF THE INVENTION

In accordance with the gyroscopic apparatus of this invention, a first element or trunnion assembly subject to angular movement in space supports for rotation in an orthogonal direction a gyro element which includes a gimbal structure having a rotatable element mounted within the gimbal structure. Mounted on the axis of the first or trunnion assembly is torque generating means, and on the axis of the gyro element gimbal structure is signal translating means for converting the rotation of the gimbal structure relative to the first element into a control signal representative of such rotation. To substantially eliminate gyro output axis cross-coupling error, gyroscopic reaction torque is employed together with the torque controlled by a feedback loop, which in a single axis platform extends from the signal translating means to the torque generating means, and includes amplifying means pre-set in a novel manner to a predetermined gain characteristic. Gyroscopic reaction torque, as is known, is the torque in gyro apparatus which opposes the applied precessional torque. The component of angular motion of the gyroscopic apparatus about the gyro element output axis results in a generated signal from the output axis pickoff due to the inherent inertial characteristics of the gyro element. This signal is amplified and applied to the torque generating means resulting in an unwanted torque component which produces unwanted angular displacement of the trunnion assembly about the trunnion axis. This unwanted displacement is the aforementioned gyro output axis cross-coupling error. Although the unwanted torque produces initial angular displacement about the trunnion axis, this torque, through feedback loop action, eventually becomes balanced with the gyroscopic reaction torque for all values of amplifier gain, thereby preventing further angular displacement of the trunnion assembly beyond that displacement reached prior to balancing. In accordance with the invention, there is a particular value of amplifier gain for which the above torque balance occurs without any angular displacement of the trunnion assembly about the trunnion axis after such balance occurs, thus resulting in substantial elimination of gyro output axis cross-coupling error. This particular value of amplifier gain is achieved when an output reading device on the trunnion shaft becomes nulled during angular motion of the apparatus so oriented that the angular motion occurs about the gyro output axis. After such adjustment, the aforementioned gyro output axis cross-coupling error is eliminated for system rotation about any axis.

In one embodiment, the aforementioned unwanted displacement is removed by the two opposing torques reaching a balanced condition at said particular amplifier null setting, and in a further embodiment amplifying means of wideband characteristics is used so that the balanced condition is achieved prior to any initial displacement of the trunnion assembly about the trunnion axis. Thus, the amplifier gain is adjusted to a particular value at which the output reading device, such as a voltmeter connected to a pickoff device on the trunnion shaft, is nulled during motion of the gyroscopic apparatus about the gyro output axis.

The invention further discloses an electrical feedback loop connected from a pickoff device on the aforementioned gyro element output axis to a particular torque generating device on the same gyro element output axis to simulate the damping effect present in a floated type gyro element when a gas bearing gyro element is used, or for the purpose of increasing the viscosity effect when a floated type gyro element is used.

The invention also includes the utilization of either a gyro element or supporting trunnion assembly, or both, having moments of inertia which, respectively, are substantially the same in all directions whenever it becomes desirable or necessary to remove the few remaining seconds of arc of error due to aforementioned anisoinertial effects.

BRIEF DESCRIPTION OF THE DRAWINGS

Further objects and advantages of the invention will become apparent from the following specification taken in conjunction with the accompanying drawings, wherein:

FIG. 1 is a combined pictorial and block diagram of a single axis platform having a floated type gyro element;

FIG. 2 is a combined schematic and block diagram of the single axis platform of FIG. 1, together with two additional gyro assemblies and mounting frame in a triad configuration;

FIG. 3 is a graph illustrating the variation in gyro output axis cross-coupling error with different values of amplifier gain;

FIG. 4 is a combined block and schematic diagram of the single axis platform feedback amplifier of FIG. 1;

FIG. 5 is a combined block and schematic diagram of the viscosity amplifier for the single axis platform of FIG. 1;

FIG. 6 is a graph illustrating the generation of well known gyro output axis cross-coupling error in the presence of applied precessional and gyroscopic reaction torque;

FIG. 7 is a graph illustrating the elimination of the cross-coupling error shown in FIG. 6; and FIG. 8 is a graph illustrating the prevention of gyro output axis cross-coupling error.

DESCRIPTION OF THE PREFERRED EMBODIMENT

Referring to FIG. 1, a single gyroscopic assembly including gyroscopic apparatus 10 is shown having a gyro element 11 comprising a rotor or rotatable member 12 driven by a spin motor 14 to rotate about a spin axis 16 by means of fixed supporting shaft 15 and ball bearings 17 within gyro element gimbal case or structure 18, sometimes referred to as a float. The gyro element gimbal case 18 is supported for rotation on well known jewel bearings, not shown, about the gyro element output axis 20 within a gyro outer casing 22. The gyro element gimbal case 18 has its longitudinal axis coaxial with the longitudinal axis of the gyro outer casing 22. The exterior diameter of the gyro element gimbal case 18 is smaller than the corresponding interior diameter of the gyro outer casing 22 resulting in a space or fluid cavity 24. Sealed within fluid cavity 24 is a viscous fluid, not shown, which serves as a viscous damper for the gyro element or float 18 and as a supporting fluid for the float 18 to minimize the frictional torques induced by jewel bearings, not shown, on the outer ends of gyro element output axis shaft extensions 26 and 27, the inner ends of which are integrally attached to float 18. Gyro outer casing 22 rotatably supports gyro output axis shaft extensions 26 and 27. The fluid also acts as a shock absorber and protects the gyro element 11.

An angular pick-off device or signal translating means 28 has its laminated stator 30 connected to or supported by the gyro outer casing 22 and its rotor mounted on extension 26 of the gyro element output axis shaft for rotation therewith in order to provide a control signal from windings 31 of stator 30 on leads 32. These leads extend from said stator through the gyro outer casing 22 and thence through a conventional slip ring assembly 34 mounted on trunnion shaft 36 which extends along the sensitive axis 38 of the gyro apparatus. The signal from pick-off device 28 has an amplitude and phase, respectively, representative of the magnitude and direction of the movement of the gyro element gimbal case 18 with respect to the gyro outer casing 22.

To apply a viscous torque about the gyro element output axis shaft extension 27 when it is desirable to increase the damping of the motion of the gyro element 11 in a manner to be described, a torque generating device or torque generator 40 has its stator 42 attached to outer casing 22 and its rotor 44 mounted on gyro element output axis shaft extension 27.

The trunnion shaft 36 comprises upper and lower collinear sections extending along the sensitive axis 38 of the gyro apparatus and is perpendicular to the gyro element output axis 20. Gyro outer casing 22 is rigidly attached to trunnion shaft 36 by means of a metallic annulus or ring 48 into which the trunnion shaft sections are press-fitted and which forms part of the trunnion assembly. Ring 48 also provides a means for balancing the mass distribution of the trunnion assembly to substantially eliminate the aforementioned anisoinertial cross-coupling. This ring or annulus extends around the gyro outer casing 22 and is rigidly attached thereto. This annulus together with trunnion shaft 36, trunnion shaft bearings, not shown, and gyro outer casing 22 and its contents, excluding gyro element 11, form the trunnion assembly. Mounted on one end of the trunnion shaft 36 is a torque generating means or torque motor 46 which applies torque to the trunnion shaft assembly. Also mounted on the trunnion shaft 36 is an output pickoff device 50, herein shown as a conventional digital encoder or digitizer which translates angular displacement into digital code. Slipring assembly 34 is also mounted on the trunnion shaft and connects input power on leads 51 to spin motor 14 and alternating current excitation on leads 52 to signal generator 28. The slipring assembly also connects by way of leads 32, one of which may be grounded, an output signal from signal generator 28 to viscosity amplifier 54. This amplifier provides an output signal proportional to the time rate of change of its input signal. Slipring assembly 34 also connects signal generator 28 to a well known feedback amplifier 56 which contains conventional loop stabilization networks. A negative feedback signal from viscosity amplifier 54 is connected through slipring assembly 34 to the torque generator 40 to increase the effective viscosity of gyro element motion relative to gyro outer case 22. An outer metallic cover 58 provides a housing for the apparatus. This housing does not rotate with shaft 36 and thus is attached to the stator or housing of torque motor 46 as well as to a supporting structure, such as a vehicle frame 61, shown in FIG. 2.

In operation, the gyroscopic apparatus 10 together with accompanying amplifiers is mounted, for example, on a vehicle frame 61 shown in FIG. 2, to provide a single axis platform gyro assembly to generate output signals representative of the incremental rotation of the vehicle relative to inertial space about one of the three mutually orthogonal vehicle axes. FIG. 2 also shows single axis platform gyro assemblies 8 and 9 which together with the first gyro assembly form a triad of strapped-down orthogonally mounted gyro apparatus to indicate the incremental rotation of the vehicle relative to inertial space about all three mutually orthogonal vehicle axes 38, 39 and 41. Upon rotation of the vehicle about the trunnion or sensitive axis 38 of the gyro apparatus, any tendency of the trunnion assembly to rotate in inertial space due to the coupling action of friction in the trunnion bearings, causes a gyroscopic reaction torque about the gyro element output axis 20 which results in a displacement of the float 18 relative to the gyro outer casing 22. Such displacement generates an output signal from the angular pickoff 28, the output signal being amplified in feedback amplifier 56 and applied to torque motor 46 to provide in a known manner a friction balancing torque to the trunnion assembly, thus eliminating the drag effect of friction upon the trunnion assembly and permitting the trunnion assembly to remain rotationally stationary in inertial space in the presence of the aforementioned vehicle rotational motion.

In this manner, the trunnion assembly is stabilized by the feedback loop to overcome friction due to vehicle motion about the sensitive or trunnion axis. However, when rotation of the vehicle resulting from imposed conditions or maneuvers about any axis contains a component of angular motion about the gyro element output axis 20, the well known inertial properties of the gyro element induce it to remain rotationally stationary in inertial space, thus resulting in angular motion of the gyro outer casing 22 relative to the float 18. This angular motion results in an output signal from angular pickoff device 28 which is amplified in feedback amplifier 56 and fed to torque motor 46. The generated torque results in angular acceleration of the trunnion assembly relative to inertial space which results in unwanted rotation of the shaft 36. The resulting angular velocity of the gyro element 11 about the trunnion axis due to this acceleration produces a gyroscopic reaction torque in the direction of the gyro element output axis 20 which is in a direction to cause the gimbal case or float 18 to move angularly so as to reduce the relative displacement between gyro outer casing 22 and float 18 or, in effect, to have the float catch up and rotate in synchronism with the casing 22. The resulting angular motion of the float about the gyro element output axis direction relative to inertial space produces gyroscopic reaction torque about the trunnion axis to oppose in an equal and opposite manner the precessional torque provided by torque motor 46, resulting in a balanced condition of torque due to feedback loop action and no further rotation of shaft 36 due to the torque of motor 46. However, in the process of becoming balanced, these opposing torques produce an unwanted angular displacement of the trunnion torques produce an unwanted angular displacement of the trunnion assembly about the trunnion axis. This latter displacement is the unwanted cross-coupling error.

It should be noted that by feedback loop action this balanced condition of torques, in which the gyroscopic reaction torque is equal and opposite to the precessional torque generated by torque motor 46, occurs at substantially all values of gain of feedback amplifier 56. However, in accordance with the invention, there is a particular value of gain of feedback amplifier 56 in which, in one embodiment of the invention, this balanced condition of torques is obtained accompanied by a substantial removal or elimination of the aforementioned cross-coupling displacement due to gyro output axis motion. The removal of such displacement is effected during the balancing process. In a further embodiment, the prevention of any occurrence of such displacement is effected from the beginning of the process.

Heretofore, the value of feedback amplifier gain was usually set relatively high in conformance with accepted servo feedback loop practice to insure rapid response and low sensivity to trunnion shaft friction. However, these relatively high values of gain contribute nothing to the reduction of cross-coupling due to motion about the gyro output axis 20. In addition to the normal output signal due to rotation of the apparatus about the input or trunnion axis, the presence of such cross-coupling results in an erroneous output signal from pickoff device or encoder 50 which indicates erroneous trunnion shaft rotation relative to the housing 58 or supporting structure, shown in FIG. 2. Thus, this output signal represents solely cross-coupling when there is motion of housing 58 relative to inertial space about the output axis 20 and no motion of the housing about the trunnion axis 38. That is, the cross-coupling is isolated when the housing 58 is so oriented that the gyro output axis is parallel to the axis of rotation of the housing 58. Pickoff device or encoder 50 indicates trunnion shaft displacement relative to housing 58, signals from the encoder being monitored by a digital counter 60. Accordingly, these signals are limited to the representation of output axis cross-coupling only when housing 58 is positioned with trunnion axis 38 orthogonal to the axis of rotation of the housing and when the output axis 20, except for the indicated cross-coupling error, is substantially parallel to the axis of rotation of the housing. At other times, such as during vehicle rotation when there are components of rotation about trunnion axis 38 as well as gyro output axis 20, the output signal from encoder 50 indicates motion of the vehicle about axis 38 as well as indicating cross-coupling due to the aforementioned component of motion about axis 20.

Thus, when the casing 22 is oriented in the aforementioned manner to indicate only cross-coupling error, as displayed by digital counter 60, in accordance with the invention, there is a particular setting of gain of the feedback amplifier 56 in which the cross-coupling error becomes nulled as indicated by a null reading of digital counter 60. At this null setting of amplifier gain, the aforementioned gyroscopic reaction torque acting about the trunnion axis 38 becomes balanced with the precessional torque or force moment generated by torque motor 46 accompanied by a substantial elimination of gyro output axis motion cross-coupling error. This gain setting is made prior to operation of the apparatus in a manner to be described in detail.

Referring to FIG. 3, there is shown the aforementioned null setting on curve 62 which represents output axis cross-coupling error versus amplifier gain. This null point, as indicated by digital counter 60, is obtained by adjusting the gain on feedback amplifier 56. When the null setting is achieved, which usually is found to be at lower values of gain than customarily used, output axis cross-coupling is substantially eliminated for all orientations of the housing 58 with respect to its axis of rotation, and thus any particular orientation of the housing, such as for the purpose of th eaforementioned isolation of cross-coupling to select the null point, is no longer required. As seen in FIG. 3, the ordinate represents output axis cross-coupling error in radians plotted against amplifier gain in voltage output per unit volt input. Torque motor 46 provides sufficient force moment to balance the gyroscopic reaction torque due to precession of the spinning gyro rotor 12, which is this embodiment is of a type sufficient to generate an angular momentum of 100,000 gm.-cm.² per second. In the present embodiment, rotor 12 is approximately 1.5 inches in diameter and is driven by a three phase, 400 cycle per second spin motor 14. For a usable precessional rate of approximately 1 radian per second of rotor 12, the gyro in outer casing 22, in which in this embodiment is a miniature integrating gyro, such as Honeywell type GG49, requires a precessional torque of approximately ten ounce-inches applied by motor 46 to shaft 36 about axis 38. To supply a torque of this magnitude, a torque motor having a conservative torque capability of 22 ounce-inches is used, and having a rated input voltage of approximately 20 volts and an input impedance of approximately 8 ohms. A typical torque motor for this purpose is that of Magnetic Technology Company, Type 1937–050–077. To drive torque motor 46 amplifier 56 is of the type which provides an output of 22 volts at approximately 2.5 amperes, such as Inland Corporation type Hyband 50A. This output assures that the precessional torque due to precession of the gyro rotor 12 at one radian per second is adequately provided by torque motor 46. Also, the gain of amplifier 56 is of a magnitude to permit gain settings beyond the null point to insure accurate definition of the null point. The adjustment of the amplifier gain to the null point is achieved with the housing 58 of gyro apparatus 10 oriented so that trunnion axis 38 is perpendicular to the axis of rotation of gyro apparatus 10 and with input axis 20 substantially parallel to the axis of rotation of gyro apparatus 10. Once the null is achieved, it is held as a permanent adjustment, permitting maneuverability of the gyro apparatus 10 around any axis accompanied by substantial elimination of cross-coupling error.

Referring to FIG. 4, the conventional feedback amplifier 56 converts the alternating current signal from angular pickoff device 28 to a direct current output of corresponding magnitude and sign which is fed to torque motor 46. The alternating current signal from pickoff device 28 on lines 32 represents the angular displacement between float 18 and casing 22. In particular, amplifier 56 comprises a well known alternating current preamplifier 64 across the output of which is connected a gain adjusting potentiometer 66. The gain provided by preamplifier 64 represents substantially the entire gain of the feedback loop. The signal from gain adjusting potentiometer 66, which is used to tune the null point, is fed to a well known phase sensitive demodulator 68, such as shown by Fig. 6.72 on page 6–63 of "Control Engineer's Handbook, published by McGraw Hill Book Company, 1958. This demodulator provides a substantially direct current output signal having an amplitude which is proportional to the amplitude of the alternating current input signal and a sign which is representative of the in-phase or out-of-phase characteristic of the voltage from angular pickoff device 28 relative to the phase of its excitation. The output from demodulator 68 is a substantially direct current output signal which is fed to a well known stabilization lead network 70 comprising a well known passive RC network, such as shown in Fig. 10.1–8 on page 255 of "Servomechanisms and Regulating System Design" by Harold Chestnut and Robert W. Meyer, published by John Wiley and Sons, N.Y., 1951. This network provides a damping correction to the output signal from demodulator 68 to insure feedback loop stability. In a further embodiment of the invention, network 70 is removed so that the feedback loop operates at or near an oscillatory mode providing insensitivity of the apparatus to output axis motion cross-coupling over a wide band of frequencies. When, as in the present embodiment, a nonoscillatory or stabilized loop is desired, lead network 70 is connected in circuit with demodulator 68 and a direct current power amplifier 72, as shown in FIG. 4. Power amplifier 72 can be a well known type such as shown on the output stage of the amplifier of Fig. 6.57 on pages 6–47 of the "Control Engineer's Handbook" with the addition of well known current feedback to increase the output impedance of the driving stage as described on page 391 of "Electronic and Radio Engineering" by F. E. Terman, published by McGraw-Hill Book Company, N.Y., 1955. Gyroscopic apparatus 10 then becomes insensitive to gyro output axis motion cross-coupling over the lower frequency portion of the band of cross-coupling frequencies, such as, for example, zero to approximately 100 cycles per second for a feedback loop having a corresponding natural frequency of 100 cycles per second.

The output of lead network 70 is fed to direct current power amplifier 72 which increases the power level of its input signal adequately to drive torque motor 46 at the aforementioned impedance level of 8 ohms. Thus, the precessional torque provided by motor 46 when driven by amplifier 56 is sufficient to balance the gyroscopic reaction torque due to gyro output axis motion of approximately one radian per second.

Referring to FIGS. 1, 2 and 5, there is shown an additional feedback loop which is used in conjunction with a viscosity amplifier 54 when it is desirable to increase the effective viscosity applied to the gyro output axis without changing the mass density of the floatation fluid in fluid cavity 24. This fluid is selected to neutrally buoy the gyro float element 11. Viscosity as used herein may be defined as an applied torque proportional to the relative angular velocity between the float element 11 and casing 22. Thus, in lieu of increasing the viscosity of the floatation fluid, the electrical viscosity loop increases, effective viscosity by providing a signal to the torque generator 40 which is proportional to the angular velocity between the float 11 and casing 22. A viscosity loop of this type is employed when it is desirable to use an air bearing type gyro having no floatation fluid and thus no appreciable viscosity on its output axis. The presence of viscosity on the output axis of the air bearing gyro in this arrangement permits achievement of the aforementioned null condition shown in FIG. 3 in conjunction with feedback amplifier 56. The gain A(0) at null condition, expressed by the formula $$A(0) = \frac{HC}{IS_{SG}S_{TM}}$$

is proportional to the effective coefficient of viscosity, C, in ounce-inches per radian per second of the viscous torque acting on the gyro output axis. In this formula, H is the angular momentum in gram-centimeters squared per second, I is the moment of inertia in gram-centimeters squared of the gyro float 11 about the gyro output axis, $S_{SG}$ is the sensitivity of the gyro signal generator 28 in volts per radian, and $S_{TM}$ is the sensitivity of the torque motor 46 in inch-ounces per volt.

Referring again to FIGS. 1 and 2 the viscosity of the floatation fluid in cavity 24 determines the amount of amplifier gain required to achieve the null point shown in FIG. 3. However, in some instances, it is desirable to increase the servo loop stiffness beyond the value usually attained with a floated gyro. Servo loop stiffness, as is known, is the ratio of external torque applied at the output or trunnion shaft to the angular deflection of the shaft relative to housing 58. Servo loop stiffness is frequently increased when it becomes desirable to decrease sensitivity to friction on the trunnion shaft as well as to minimize spin reference axis cross-coupling. In these cases, viscosity amplifier 54 of FIGS. 2 and 5 is used to provide additional effective viscosity at gyro output axis 20 and to permit larger values of gain of feedback amplifier 56 to be used and still attain the aforementioned null condition. It follows that viscosity amplifier 54 preferably is set to provide the desired viscosity along the gyro output axis prior to tuning for the null setting on feedback amplifier 56. It should be noted, however, when a floated gyro is used, output axis motion cross-coupling is substantially eliminated by the arrangement shown in FIG. 1 even in the absence of the viscosity loop inasmuch as the floatation fluid in cavity 24 provides sufficient viscosity to permit a null point to be reached.

When the embodiment of FIG. 1 includes the use of a lead stabilization network in amplifier 56, stabilization of the gyroscopic reaction torque with the applied torque of motor 46 is accompanied by some initial or transient cross-coupling; that is, displacement of the trunnion shaft relative to housing 58 occurs prior to balance of these torques. This initial displacement occurs even when amplifier 56 is adjusted to the null point shown in FIG. 3. Following the above transient, the cross-coupling error becomes reduced to substantially zero. However, in the absence of tuning or setting the gain of amplifier 56 to the value which achieves the aforementioned null, a permanent displacement or cross-coupling error occurs as is shown by curve 80 of FIG. 6, which represents the prior art and shows this cross-coupling displacement error versus time. In particular, curve 81 of FIG. 6 shows the developed torque of motor 46, in the absence of the aforementioned tuning of the feedback loop, contributing to permanent cross-coupling error prior to a balance occurring at a point 74 in time between the motor torque of curve 81 and the gyroscopic reaction torque developed at the trunnion shaft shown by curve 82. FIG. 7, however, shows the result of the aforementioned tuning of the feedback amplifier according to the invention in which the developed torque of motor 46 shown by curve 83 initially contributes to the rise of a transient cross-coupling error shown by curve 84 prior to becoming substantially eliminated as a result of the null condition when the gyroscopic reaction torque of curve 85 becomes balanced at time point 76 with the torque developed by motor 46. FIG. 7 thus shows the overshoot of curve 85 due to the null point of FIG. 3 as the overshoot effects the reduction of trunnion shaft displacement shown by curve 84, resulting in the substantial elimination of cross-coupling error as achieved by the arrangement shown in FIG. 1.

When, however, it is desired to obtain elimination of cross-coupling error with substantially no displacement of the trunnion shift 36, not even for a transient interval prior to the aforementioned balanced condition, lead network 70 of FIG. 4 is removed from amplifier 56 in the associated feedback loop. This removal is achieved by connecting the output of phase sensitive demodulator 68 directly to the input of D.C. power amplifier 72 through well known impedance matching means, not shown. Removal of the network results in a substantially flat frequency response for amplifier 56 and a substantially zero time lag between the initiation of the gyroscopic reaction torque and the opposing precessional torque of motor 46. As a consequence, cross-coupling error displacement of the trunnion shaft never occurs. This balanced operation is shown in FIG. 8 in which the gyroscopic reaction torque of curve 86 is seen at all times opposing in a substantially equal and opposite manner the applied torque of motor 46 shown by curve 87. Thus, the wide band amplification of feedback amplifier 56 together with tuning for the null point of FIG. 3 results in substantial elimination of output axis cross-coupling error from the beginning of angular motion tending to cause such error, and thus no displacement of the trunnion shaft due to such error occurs. However, a small amplitude dither at the natural frequency of the system may occur which does not contribute to error in indicated vehicle attitude. In the event it is desirable to reduce any remaining small amplitude dither, known techniques, such as the introduction of non-linear elements in the amplifier feeding the trunnion-axis motor can be used to reduce effective amplifier gain for large signal amplitudes.

Referring to FIG. 5, signal generator 28 has an excitation winding 89 being fed by an alternating current excitation source 91. Output winding 93 of signal generator 28 provides an alternating current signal proportional to gyro output axis displacement. This output signal is applied through slipring assembly 34 into viscosity amplifier 54 which comprises a conventional alternating current preamplifier 90 to which is connected a well known phase sensitive demodulator 92 such as shown in the aforementioned "Control Engineer's Handbook." RC differentiating network 95 comprises capacitor 94 and resistor 96 and provides a drive signal proportional to the velocity of the displacement of the gyro output axis relative to outer casing 22. Thus, while the output of phase sensitive demodulator 92 is a signal proportional to displacement, the output of the RC network is a viscosity signal for frequencies having a value less than the reciprocal of the RC time constant, which is applied to direct current power amplifier 98 which is a current source driver such as that described in connection with D.C. power amplifier 72. Utilization of a direct current power amplifier which operates as a current source driver is preferable in order to minimize the introduction of torque noise or spurious torque on the shaft of torque generator 40. Such noise normally results from use of a voltage type driving source. The output of power amplifier 98 is applied by way of slipring assembly 34 of FIG. 1 to drive winding 99 of the torque generator 40 to increase the effective viscosity of the gyro element motion relative to gyro outer case 22. In this manner, a floated gyro unit with low intrinsic viscosity can be used since the viscosity amplifier adds the required amount of viscosity to achieve the desired viscous level. When a gas bearing gyro is employed, that is a gyro in which the gyro output axis is supported by air bearings, the viscosity amplifier becomes necessary in order to adjust the gain of amplifier 56 to the null point shown in FIG. 3. The generation of effective viscosity by amplifier 54 is necessary in the air bearing gyro because, as shown in the equation accompanying FIG. 3, the gain value of feedback amplifier 56, $A(0)$, is directly proportional to the effective coefficient of viscosity C, associated with the gyro output axis, and this coefficient approaches zero for air bearing gyros.

Since the value C is substantially zero for air bearing gyros, the aforementioned viscosity is provided artificially by the output velocity signal from viscosity amplifier 54 in connection with torque generator 40. In amplifier 54 the gyro output axis displacement signal is converted to a velocity signal which, in connection with torque generator 40, applies a viscous torque about the gyro output axis shaft.

Referring to FIG. 1, a further object of the invention is the substantial elimination of anisoinertial cross-coupling error which tends to become additive to gyro output axis cross-coupling error. This object is achieved by providing that the separate moments of inertia of the gyro element 11, including gyro rotor 12 and spin motor 14 of FIG. 1, are substantially the same in all directions as well as the separate moments of inertia of the trunnion assembly which also are substantially the same in all directions, regardless of the particular geometrical configuration of either the gyro element or the trunnion assembly. In the present instance, this effect is obtained with respect to gyro element 11 by first constructing the gyro rotor in a spherical configuration inasmuch as the rotor comprises the major portion of the weight of the gyro element 11. Thus, rotor 12 is shown composed of two mating hemispheres held together by metallic pins, machine threads or other well known means, not shown. The associated synchronous spin motor 14 is inserted within a cavity provided within the rotor 12. The float unit or gyro element 11 is tailored according to well known design principles so that when spin motor 14 and rotor 12 are assembled with the supporting shaft 15 and bearings 17 within case 18 to form gyro element 11, the moment of inertia of element 11 measures the same about any axis. Gyro element 11 can be tested for this isoinertial property by known methods prior to assembly within the gyro outer case 22. One of such methods consists of attaching the gyro element 11 to a torsional suspension, such as piano wire, which is successively attached to several different points in a rigid manner, such as, by a thin metallic band. The torsional suspension is fixed to an overhead supporting structure so that the supporting wire and gyro element constitute a torsional pendulum which, when manually set into small amplitude rotary vibration, exhibts a characteristic frequency of rotary oscillation. The desired isoinertial property of gyro element 11 is manifest by noting equal oscillation frequencies for all of the successive positions of suspension attachment. In this manner, there is provided means for verifying the specified isoinertial characteristics of element 11 which result from well known balancing methods as are used in the construction of balanced rotary equipment, such as high speed turbine wheels and the like.

In like manner, the trunnion assembly comprising gyro outer case 22, together with torque motor 40, signal generator 28, annulus or ring 48, drive shaft 36, rotor of torque motor 46 and rotor of digitizer 50, is fabricated by well known methods to provide a moment of inertia which is substantially the same in all directions, as determined by the above described technique. When the individual moments of inertia of the trunnion assembly are made substantially equal in all directions and the individual moments of inertia of the gyro element are made substantially equal in all directions, gyro element 11 is inserted within case 22 and both the trunnion assembly and gyro element 11 are assembled and connected in a well known manner within outer casing 58, as shown in FIG. 1. Thus, when the isoinertial characteristics of gyro element 11 and the trunnion assembly are utilized in connection with the tuning of feedback amplifier 56 to the aforementioned null point in FIG. 3, there results a gyro apparatus in which both anisoinertial cross-coupling and gyro output axis motion cross-coupling are substantially eliminated, thereby providing a self contained gyro apparatus having a dynamic sensing accuracy not heretofore obtained. Thus, gyroscopic apparatus embodying the aforementioned tuning of amplifier 56 to eliminate gyro output axis motion cross-coupling provides a means for accurately measuring angular motion relative to inertial space of a body upon which the apparatus is mounted, and remaining slight inaccuracies of the order of one or two seconds of arc can be removed by the inclusion of the aforementioned isoinertial configuration.

This completes the description of the embodiments of the invention illustrated herein. However, many modifications and advantages thereof will be apparent to persons skilled in the art without departing from the spirit and scope of this invention.

What is claimed is:

1. Gyroscopic apparatus comprising a first movable gyroscopic element supported for rotation about a first axis and supporting a rotatable element on an orthogonal axis, a second movable gyroscopic element supporting said first movable element and adapted for rotation about an axis orthogonal to the first axis, means for generating an error signal proportional to the displacement of said first element about said first axis relative to said second element due to coupling of motion about said latter orthogonal axis, torque generating means for applying a force moment about the rotational axis of said second element including amplifying means fed by said error signal, and means for setting the gain of said amplifying means to a value to null an indication of displacement of said second element about said latter orthogonal axis resulting from motion of said gyroscopic apparatus about said first axis.

2. Gyroscopic apparatus comprising a base subject to rotative movement in space, torque generating means on said base adapted to apply torque about a first axis when said torque generating means is actuated, a trunnion element mounted for rotation about said first axis and driven by said torque generating means, a gyro element rotatably mounted on a second axis orthogonal to said first axis and having a pickoff device providing a control signal indicating angular displacement of said gyro element relative to said trunnion element, a rotor element rotatably supported within said gyro element on an axis orthogonal to said second axis, amplifier means fed by said control signal to provide a drive signal feeding said torque generating means, an indicating device on said first axis adapted to provide an output in response to rotation of said trunnion element about first axis relative to said base, and means for adjusting the amplification of said amplifying means to a null reading on said indicating device during rotation of said gyroscopic apparatus so oriented that said second axis is parallel to the axis of rotation.

3. In combination, at least three elements supported for rotation about three independent axes, the first and second of said axes being orthogonal to each other, means for translating rotation of a first of said elements relative to a second of said elements into a control signal representative of said rotation, torque generating means for applying torque to said second of said elements about its rotational axis, means for altering said control signal by a predetermined amount, and means for feeding the output of said altering means to said torque generating means to null displacement of said second element about its rotational axis resulting from a component of angular motion of all three elements about the axis of said first element.

4. The apparatus of claim 3 in which the altering means for said control signal is wideband so as to prevent initial angular displacement of said second element.

5. A gyroscopic system comprising at least three gyroscopic elements two of which have input axes and output shafts, said three elements supported for rotation about independent shafts, the output shaft of said first and of said second of said elements being orthogonal to each other, means for balancing the gyroscopic reaction torque of said first element with applied precessional torque about the output shaft of the second of said elements, said means including feedback loop amplification means adjusted to prevent residual angular displacement of said output shaft of said second element due to a component of motion about the output shaft of said first element resulting from rotation of said gyroscopic system about any axis.

6. The system of claim 5 in which the feedback loop amplification means includes a wideband amplifier to prevent initial as well as residual angular displacement of said output shaft of said second element.

7. Gyroscopic apparatus comprising a trunnion assembly adapted for rotation only about a first axis and subject to angular motion in space, a gimbal structure mounted for rotation about a second axis orthogonal to said first axis and a gyro rotor supported by said gimbal structure for rotation about a third axis, means for translating rotation of said gimbal structure relative to the trunnion assembly into a control signal representative of said latter rotation, torque producing means for applying a torque to the trunnion assembly about the first axis in a manner which is equal and opposite to gyroscopic reaction torque of said gyroscopic apparatus to render said gyroscopic apparatus insensitive to cross-coupling resulting from said gyroscopic reaction torque due to the angular motion of said gyroscopic apparatus about any axis having a component of motion about said second axis, said means including an amplifier having a predetermined gain characteristic in circuit with said rotational translating means and said torque producing means.

8. The gyroscopic apparatus of claim 7 in which the respective moments of inertia of the trunnion assembly and the gimbal structure are substantially equal in all directions.

9. In combination, at least three elements supported for rotation about three independent axes, the first and second of said axes being orthogonal to each other, means for translating rotation of a first of said elements relative to a second of said elements into a control signal representative of said rotation, the third of said elements having its axis orthogonal to the axis of the first of said elements, torque generating means for applying torque about the rotational axis of said second of said elements in a manner equal and opposite to gyroscopic reaction torque which results from rotation of said third element about the axis of said first element, means for amplifying said control signal an amount to substantially eliminate cross-coupling resulting from said gyroscopic reaction torque, and means for feeding the output of said ampifying means to said torque generating means.

10. Gyroscopic apparatus comprising at least three elements supported for rotation about three independent axes, the first and second of said axes being orthogonal to each other, means for translating rotation of a first of said elements relative to a second of said elements into a control signal representative of said rotation, the third of said elements having its axis orthogonal to the axis of the first of said elements, torque generating means for applying torque about the rotational axis of said second of said elements, means for amplifying said control signal a predetermined amount in which the gyroscopic reaction torque balances the applied precessional torque by said torque generating means so that displacement of the trunnion assembly relative to the gyroscopic apparatus is substantially zero when the axis of rotation of said gyroscopic apparatus is parallel to the axis of the first of said elements, and means for feeding the output of said amplifying means to said torque generating means.

11. Apparatus having a first element adapted for rotation about a first axis and subject to angular movement in space, a gimbal structure mounted for rotation about a second axis orthogonal to the first axis and supported my said first element, a rotating element mounted within said gimbal structure for rotation about a third axis, said rotation of said gimbal structure about said second axis generating undesirable gyroscopic reaction torque about said first axis, means for translating rotation of said gimbal structure relative to first element into a control signal representative of said rotation, means for applying torque about the axis of said first element in a manner equal and opposite to the gyroscopic reaction torque of said rotating element mounted for rotation about said third axis, said latter means rendering said apparatus insensitive to cross-coupling resulting from said gyroscopic reaction torque produced by a component of angular motion of said apparatus about said second axis, said latter means including a signal amplifier having a predetermined gain characteristic in circuit with said rotational translating means and said torque applying means.

12. Gyroscopic apparatus comprising a trunnion assembly rotatable about a trunnion axis, a gyro element supported for rotation by said trunnion assembly and a rotor element supported for rotation by the gyro element, means for extracting a signal indicative of angular rotation of said gyro element relative to the trunnion assembly, means for differentiating the said signal to provide a control signal indicative of the angular velocity of said gyro element relative to the trunnion assembly, means in response to said control signal for applying a torque to said gyro element about its output axis, thus simulating viscous drag of said gyro element relative to said trunnion assembly, and means for nulling rotational displacement of said trunnion assembly resulting from a component of angular motion of said gyroscopic apparatus about the output axis of said gyro element.

13. The gyroscopic apparatus of claim 12 in which the respective moments of inertia of the trunnion assembly and the gyro element are substantially equal in all directions.

14. An attitude indicating system employing a triad of strapping down single axis gyro assemblies mounted on a vehicle, each gyro assembly including a trunnion assembly having equal moments of inertia about its three axes and a gyro element supported for rotation by said trunnion assembly and having equal moments of inertia about its three axes, torque generating means for applying torque about the output axes of each of said trunnion assemblies, angular indicating means on the output axis of each trunnion assembly, a signal generator providing a signal indicating rotation of the output axis of each gyro element relative to its trunnion assembly and a torque generator on the output axis of each gyro element, means for electrically introducing artificial gyro element output axis viscosity in each of said gyro assembiles, said latter means including electrical signal differentiating means connected in circuit with each signal generator and its corresponding torque generator, means for amplifying and feeding the output of each said signal generators to said torque generating means, and means for adjusting said amplifying means to a null reading on said angular indicating means during rotation of each gyro assembly so oriented that its respective gyro element output axis is parallel to the axis of rotation of the corresponding gyro assembly.

15. Gyroscopic apparatus comprising an isoinertial gyroscopic element and an isoinertial trunnion element rotatably supporting said gyroscopic element for rotation about a single axis orthogonal to the axis of said trunnion element, torque generating means for driving said trunnion element and signal generating means for producing a signal representing rotation of said gyroscopic element, means for coupling said elements together in a feedback loop having sufficient signal amplification around the loop such that gyroscopic reaction torque normally produced by said gryoscopic element becomes balanced with the applied precessional torque of said trunnion element, and means in conjunction with said feedback loop for nulling an indication of rotation of said gyroscopic apparatus about the output axis of said trunnion element during the rotation of said gyroscopic apparatus about the output axis of said gyroscopic element.

16. An attitude indicating system employing a triad of strapped down single axis gyro assemblies mounted on a vehicle, each gyro assembly including a trunnion assembly having equal moments of inertia about its three axes and a gyro element supported for rotation by said trunnion assembly and having equal moments of inertia about its three axes, gyro signal generating means for indicating rotation of said gyro element relative to said trunnion assembly and a gyro torque generator on the output axis of each gyro element, and means for electrically introducing artificial gyro output axis viscosity in each of said gyro assemblies, said latter means including electrical signal differentiating means connected in circuit with each gyro signal generating means and its corresponding gyro torque generator.

17. The system of claim 16 in which each gyro torque generator is driven from a current source.

18. The system of claim 16 in which torque generating means for applying torque about the output axis of each of said gyro assemblies is connected in a feedback loop including said gyro signal generating means, the output of which provides a control signal, amplifying means fed by said control signal, said amplifying means driving each gyro torque generating means, and means for adjusting the level of each of said amplified control signal to null cross-coupling resulting from a component of angular motion of said attitude indicating system about each gyro output axis.

19. Gyroscopic apparatus comprising a trunnion assembly having individual parts each weighted according to its position from a centrally located point to provide equal moments of inertia about the three axes of said trunnion assembly, and a gyro element supported for rotation by said trunnion assembly and having its individual parts also weighted according to their position from said centrally located point to provide equal moments of inertia about the three axes of said gyro element.

20. Gyroscopic apparatus comprising a gyro element including a rotor element, said gyro element having individual parts each weighted according to its position from a centrally located point to provide equal moments of inertia about the three mutually orthogonal axes of said gyro element, said gyro element being supported for rotation about the output axis for said gyroscopic apparatus.

21. Gyroscopic apparatus comprising a gyroscopic element and a trunnion element each having individual parts each weighted according to its distance from a centrally located point to provide equal moments of inertia about all axes, said trunnion element rotatably supporting said gyroscopic element whereby anisoinertial cross-coupling is substantially eliminated.

References Cited
UNITED STATES PATENTS

| | | | |
|---|---|---|---|
| 2,714,311 | 8/1955 | Dobson et al. | 74—5 |
| 2,762,123 | 9/1956 | Schultz et al. | |
| 2,815,667 | 12/1957 | Waldstein | 74—5 |
| 2,893,248 | 7/1959 | Ecary | 74—5.34 |
| 3,004,437 | 10/1961 | Pittman | 74—5.34 |
| 3,071,977 | 1/1963 | Bosch et al. | 74—5.34 |
| 3,254,419 | 6/1966 | Hurlburt | 74—5 XR |

MILTON KAUFMAN, Primary Examiner

M. A. ANTONAKAS, Assistant Examiner

U.S. Cl. X.R.

74—5.6